INVENTOR
William M. Slifer Jr.

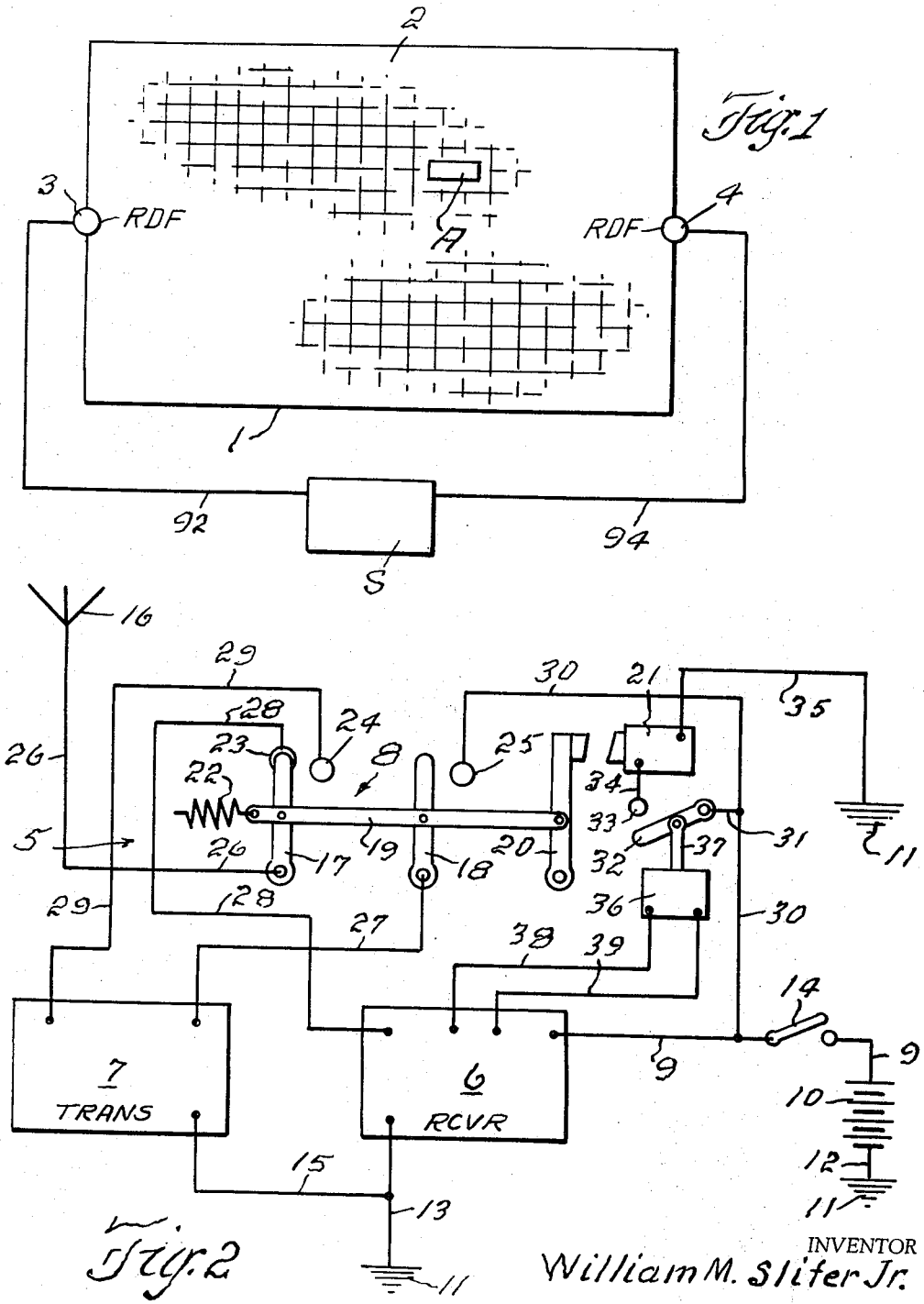

BY Chas. H. Trotter
ATTORNEY

United States Patent Office 3,357,020
Patented Dec. 5, 1967

3,357,020
METHOD AND APPARATUS FOR LOCATING AND VISUALLY INDICATING THE POSITION OF A VEHICLE
William M. Slifer, Jr., 8723 1st Ave.,
Silver Spring, Md. 20910
Filed Apr. 4, 1966, Ser. No. 539,715
2 Claims. (Cl. 343—100)

ABSTRACT OF THE DISCLOSURE

A mobile radio receiver and transmitter mechanism mounted on an automobile, a station radio transmitter and a receiving and indicating mechanism which are located at a central station, and a pair of radio direction finder stations which are mounted in opposed spaced fixed positions in the perimeter of a selected area.

---

Figure 3:
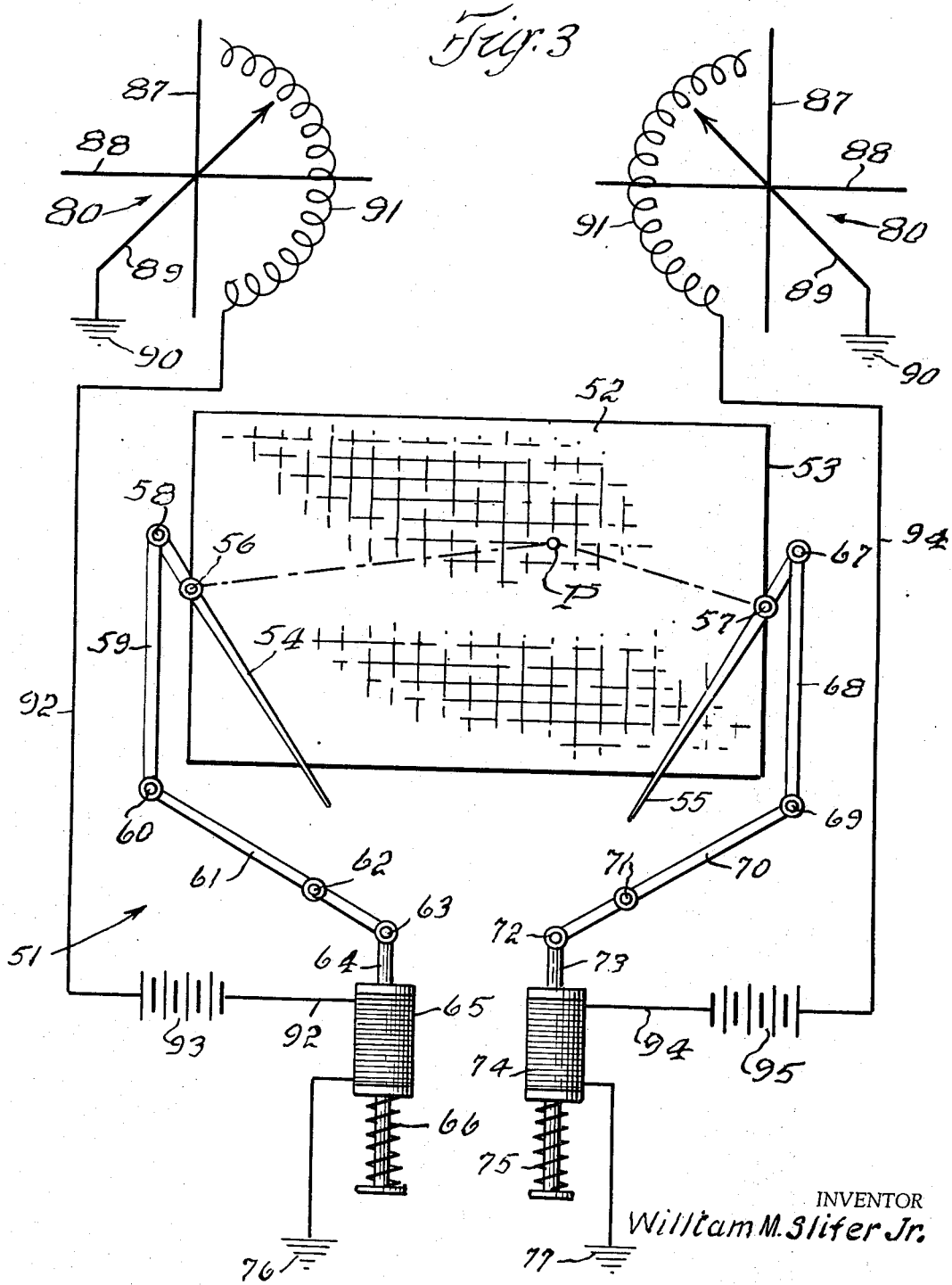

This invention relates to a method of and an apparatus for quickly and accurately determining and visually indicating the exact location, in a pre-selected area such as a city, of a stolen automobile which is equipped with certain apparatus in accordance with the invention; and if the automobile is moving, for indicating the path of movement thereof in the said area.

The principal object of the invention is to provide a method of and apparatus for quickly and accurately locating a stolen automobile, which utilizes electromagnetic signal waves which are transmitted back and forth between a stolen automobile, which is equipped with certain radio receiving and transmitting apparatus and a fixed central station which is likewise equipped with certain transmitting and indicating apparatus.

Another object of the invention is to provide a radio-dynamic vehicle locating system which is operative to locate a vehicle in a pre-selected area, and to visually indicate on a map of the pre-selected area the exact location of the vehicle in the pre-selected area.

Another object of the invention is to provide a method and apparatus of the aforesaid character in which the various units of the apparatus all comprise standard, well known, conventional electronic mechanisms.

Another object of the invention is to provide an apparatus of the aforesaid character that is of relatively simple construction, is very accurate in operation, and is spontaneous in response once operation thereof is initiated.

In accordance with the invention the apparatus comprises generally a mobile radio receiver and transmitting mechanism, a station radio transmitter, and a receiving and indicating mechanism, and a pair of radio direction finder stations which are mounted in opposed spaced fixed position in the perimeter of a selected area.

The mobile receiver-transmitter mechanism which is adapted to be mounted on an automobile, preferably in a hidden place, comprises a standard radio receiver which is adjusted to receive electromagnetic code pulses which are broadcast at a selected predetermined frequency, and a normally inactive conventional radio transmitter which is operative to generate and emit electromagnetic wave pulses at a predetermined set frequency when activated. The mobile receiver-transmitter mechanism also includes switching means through which the transmitter is rendered active by the receiver to emit said wave pulses upon the receiver receiving the particular code signal for which it is adjusted. It is contemplated that similar receiver-transmitter mechanisms will be installed in a great number of different automobiles, and that each receiver will be adjusted to receive a different code signal upon receipt of which it will activate its associated transmitter.

The station transmitter and indicating mechanism, which are disposed in a fixed central broadcasting station which is preferably located in the police station for the pre-selected area, comprise a conventional ratio transmitter mechanism which is adapted to broadcast electromagnetic wave pulses at any desired frequency within a predetermined range; and an indicating mechanism which is associated therewith and comprises a map of the selected area having a pair of rotatably mounted pointers associated therewith in accordance with the location of the pair of radio direction finders in the perimeter of the selected area. Electric actuating means which are connected between each of the pointers and one of the radio direction finder stations are operative to rotate the pointers about their respective pivots in accordance with current supplied thereto from the radio direction finder stations, for intersection over said map.

Each radio direction finder station includes a pickup device which is operative to directively receive electromagnetic wave pulses emitted by a mobile transmitter carried by an automobile and impart current to the pointer actuating means of the indicating mechanism in accordance with the direction in which the electromagnetic wave pulses were received from the mobile transmitter.

When an automobile which is equipped with the receiver-transmitter mechanism of the invention is stolen, the owner thereof reports the theft to the operator at the central station and tells him the code signal frequency for which the receiver on the automobile is adjusted to receive. The operator then actuates the station transmitter to generate and broadcast electromagnetic wave pulses at the frequency for which the radio receiver on that automobile is adjusted to receive.

If the stolen automobile is within the pre-selected area the wave pulses are picked up by the receiver on the automobile, which then, through the interconnecting switching means, activates the associated transmitter to generate and emit electromagnetic wave pulses. The wave pulses emanating from the stolen automobile are directively received by the pickup devices at the spaced pair of radio direction finder stations, which then effect the supplying of current to the actuators for the pointers, associated with the map of the pre-selected area at the central station, which current is in accordance with the direction from which the wave pulses are received at the two direction finder stations. The current thus received effects the actuation of the two pointers so that each pointer points in the same direction in which the wave pulses are received at the associated connected direction finder station. The intersection of the two pointers over the map visually indicates, on the map, the exact location of the stolen automobile in the pre-selected area.

Having stated the principal objects of the invention other and more specific objects thereof will be apparent from the following specification and the accompanying drawing forming a part thereof in which:

FIGURE 1 is a diagrammatic layout of a system for locating a specific automobile in a certain pre-selected area, which system is arranged according to the invention;

FIG. 2 is a diagrammatic view of the mobile receiver-transmitter mechanism which constitutes a unit of the system disclosed in FIG. 1, and is adapted to be mounted on and carried by an automobile; and FIG. 3 is a diagrammatic view illustrating the construction and arrangement of the station transmitter and indicating mechanisms which are located at a central fixed station, and the pickup devices disposed in the radio direction finder stations which are located in fixed position in the perimeter of a selected area, and which constitute other units of the system disclosed in FIG. 1.

The arrangement and construction of the system and apparatus for locating and visually indicating the position of an automobile in a pre-selected area and the mode of operation thereof having been generally described, it will now be specifically described in connection with the drawings with the use of reference characters in which the numeral 1 indicates the perimeter of a pre-selected area 2, which may be a section of a city or other terrain. A pair of radio direction finder stations, generally indicated by the numerals 3 and 4 respectively, are mounted in fixed position in spaced opposed relation to each other in the perimeter 1 of the area 2.

The mobile receiver-transmitter mechanism, generally indicated by the numeral 5, which is adapted to be mounted on an automobile A, comprises a standard conventional radio receiver 6 which is adapted to be adjusted to receive coded electromagnetic wave pulses which are broadcast at a predetermined frequency, and a normally inactive standard conventional radio transmitter 7 which is operative, when activated, to generate and emit electromagnetic wave pulses. The receiver 6 is operative, upon the receipt of a code pulse, to activate the transmitter 7, through an interposed control mechanism generally indicated by the numeral 8, to generate and emit electromagnetic wave pulses at a predetermined frequency.

The receiver 6 is connected by a conductor 9 to a battery 10, which in turn is connected to a ground 11 by a conductor 12. The receiver 6 is connected to the ground 11 by a conductor 13. A master switch 14, by which the entire receiver-transmitter mechanism 5 is rendered operative or inoperative, is interposed in the conductor 9. The transmitter 7 is adapted to be connected to the battery 10, through the control mechanism 8 and the conductor 9, and is connected to the ground 11 by a conductor 15 and the conductor 13. Both the receiver 6 and the transmitter 7 are adapted to be alternately connected to an antenna 16 by the control mechanism 8.

The control mechanism 8 comprises a pair of pivoted switch arms 17 and 18 which are connected together, for movement in unison, by a link 19 having one end thereof pivotally connected to a pivoted armature 20 which is adapted to be attracted by a relay magnet 21. The switch arms 17 and 18 and the armature 20 are normally yieldingly biased to the position shown in FIG. 2 by a spring 22 which is connected to the free end of the link 19. When the relay magnet 21 is energized the armature 20 is attracted thereto which swings the switch arm 17 out of engagement with a contact 23 and into engagement with a contact 24, and the switch arm 18 from a neutral or off position into engagement with a contact 25. The switch arm 17 is connected to the antenna 16 by a conductor 26, and the switch arm 18 is connected to the transmitter 7 by a conductor 27. The contact 23 is connected to the receiver 6 by a conductor 28. The contact 24 is connected to the transmitter 7 by a conductor 29, and the contact 25 is connected to the conductor 9 by a conductor 30, and through the conductor 9 and switch 14 to the battery 10. The relay magnet 21 is connected to the battery 10 through the conductor 9, conductor 30, a branch conductor 31, a switch arm 32, a contact 33 and a conductor 34, and to the ground 11 by a conductor 35. The switch arm 32 is adapted to be moved into and out of engagement with the contact 33 by a time delay mechanism 36 through a connecting link 37. The time delay mechanism 36 is connected to the receiver 6 by conductors 38 and 39. From the foregoing it will be seen that when the switch 14 is closed and the control mechanism 8 is in its normal condition, as shown in FIG. 2, the receiver 6 is connected to the antenna 16 through the conductor 28, contact 23, switch arm 17, and conductor 26, and that the transmitter 7 and antenna 16 are disconnected; and that when the armature 20 has been attracted to the relay magnet 21 the receiver 6 and antenna 16 are disconnected and the transmitter 7 connected to the antenna 16 through the conductor 29, contact 24, switch arm 17, and conductor 26. It will further be seen that when the control mechanism 8 is in its normal condition and the control switch 14 closed that the circuit between the receiver 6 and the battery 10 is unbroken; that the circuit between the battery 10 and the relay magnet 21 is broken due to the switch arm 32 being out of engagement with the contact 33, and that the circuit between the battery 10 and the transmitter 7 is broken due to the switch arm 18 being out of engagement with the contact 25. The receiver 6 is therefore energized and operative to receive electromagnetic code signal pulses, and the relay magnet 21 and the transmitter are de-energized and inoperative.

When the receiver 6 receives the code pulse signal for which it is adjusted to receive, and which is picked up by the antenna 16, it activates the time delay mechanism 36, through the conductors 38 and 39, which then moves the switch arm 32 into engagement with the contact 33, thereby closing the circuit to and energizing the relay magnet 21. The relay magnet 21, being energized, attracts the armature 20, which through the link 19 moves the switch arm 17 out of engagement with the contact 23 and into engagement with the contact 24, and the switch arm 18 from its neutral position into engagement with the contact 25. The receiver 6 is thereby disconnected from the antenna 16, and the transmitter 7 connected to the antenna 16 by the movement of the switch arm 17 out of engagement with the contact 23 and into engagement with the contact 24. The movement of the switch arm 18 out of neutral position into engagement with the contact 25 closes the circuit to and energizes the transmitter 7. The transmitter 7 upon being energized automatically generates electromagnetic pulses and broadcasts them out from the antenna 16. After a predetermined length of time the time delay mechanism 36 automatically moves the switch arm 32 out of engagement with the contact 33 thereby breaking the circuit to and de-energizing the relay magnet 21. The relay magnet 21, being de-energized, releases the armature 20 thereby allowing the spring 22, through the link 19, to shift the switch arm 17 back out of engagement with the contact 24 and into engagement with the contact 23, and to shift the switch arm 18 back out of engagement with the contact 25 and into its neutral position. The transmitter 7 is thereby disconnected from the antenna 16 and the receiver 6 reconnected thereto; and the circuit between the battery 10 and the transmitter 7 is broken thereby rendering the transmitter 7 inoperative to generate and broadcast electromagnetic pulses until the receiver 6 again receives another code pulse at which time the operation just described is repeated.

The station transmitter and indicating mechanisms, which are located in a central station S, comprise a standard conventional radio transmitter which is operative to generate and broadcast radiant energy pulse signals at any selected frequency, and the indicating mechanism, shown in FIG. 3 and generally indicated by the numeral 51, which is operative to visually indicate, on a map of a preselected area 2, the location of an automobile A in the preselected area 2.

The indicating mechanism 51, which is adapted to be mounted in fixed position on any suitable support such as a table or wall, comprises a map 52, of the preselected area 2, the outline 53 of which corresponds to the perimeter 1 of the preselected area 2. A pair of pointers 54 and 55 which are associated with the map 52 are rotatably mounted, upon pivot pins 56 and 57 respectively, for back and forth rotary movement across the face of the map 52. The pivot pins 56 and 57 are mounted in the outline 53 of the map 52 in accordance with the location of the radio direction finder stations 3 and 4 in the perimeter 1 of the preselected area 2. The outer end of the pointer 54 is pivotally connected at 58 to the upper end of a link 59 having the lower end thereof pivotally connected at 60 to one end of a lever 61 which is rotatably mounted upon a fixed pivot pin 62. The other end of the lever 61 is pivotally connected at 63 to the upper end of the core 64 of a solenoid 65 which is grounded as indicated at 76. The lower end of the core 64 is provided with a spring 66 which tends to pull the core 64 downwardly within the solenoid 65. The outer end of the pointer 55 is pivotally connected at 67 to the upper end of a link 68 having the lower end thereof pivotally connected at 69 to one end of a lever 70 which is rotatably mounted upon a fixed pivot pin 71. The other end of the lever 70 is pivotally connected at 72 to the upper end of the core 73 of a solenoid 74 which is grounded as indicated at 77. The lower end of the core 73 is provided with a spring 75 which tends to pull the core 73 downwardly within the solenoid 74.

Each of the radio direction finder stations 3 and 4 are provided with similar pickup devices 80 for receiving electromagnetic wave pulse signals from the transmitter 7 carried by the antomobile A. The pickup device 80 of each radio direction finder station 3 and 4, which are diagrammatically shown, comprises two fixed coils 87 and 88 and a movable coil 89 which is grounded as indicated at 90. When electromagnetic waves or signals from the transmitter 7, carried by the automobile A, reach the pickup devices 80 at the radio direction finder station 3 and 4, oscillating currents are produced in the coils 87 and 88. These oscillations compound to form a single magnetic field with a direction perpendicular to that from which the waves come. The strength of the induced current in the movable coil 89 will depend upon its orientation with respect to the resultant magnetic field and will be at a maximum when the movable coil 89 is in a position to embrace as many as possible of the lines of magnetic force. This optimum direction is perpendicular to the field and therefore parallel to the direction from which the waves are coming. Therefore the movable coil 89 will, upon the receipt of electromagnetic waves, be turned to point toward the automobile A from which the waves are coming. Each device 80 also includes a resistance 91. The resistance 91 of the pickup device 80 of the radio direction finder station 3 is connected to the solenoid 65, by which the pointer 54 is activated, by a circuit 92 having a battery 93 interposed therein; and the resistance 91 of the pickup device 80 of the radio direction finder station 4 is connected to the solenoid 74, by which the pointer 55 is actuated, by a circuit 94 having a battery 95 interposed therein. The current passing through the circuits 92, 94 to the solenoids 65, 74 energizes the solenoids 65, 74 which being energized lift the cores 64, 73 against the stress of the springs 66, 75 and thereby impart turning movement to the pointers 64, 55. The radio direction finder stations 3 and 4 are so positioned with respect to each other and the preselected area 2 that the planes of direction of the two movable coils 89 intersect at the automobile A from which the electromagnetic wave pulse signals emanate. In moving into position, as determined by the position of the automobile A in the area 2, the movable coils 89 add to or take resistance from the circuits 92, 94. The subtraction of resistance from the circuits strengthens the current therein and thus further lifts the cores 64, 73 thereby moving the indicating ends of the pointers 54, 55 upward and at their intersecting point P indicate on the map 52 the position of the automobile A in the area 2. Conversely, the addition of resistance to the circuits 92, 94 lessens the current passing therethrough and hence the springs 66, 75 move the cores 64, 73 downwardly and thus depress the indicating ends of the pointers and change their point of intersection P. The change in position of the point of intersection P on the map 52 corresponds to the change in position of the automobile A in the area 2, and thus the position of the automobile A in the area 2 is at all times visually indicated on the map 52.

The construction and operation of the indicating mechanism 51 and the pickup devices 80 are similar to those shown in the U.S. Patent to J. H. Hammond, Jr., No. 1,115,530.

If an automobile A, equipped with the mobile receiver-transmitter mechanism 5, is stolen the owner thereof reports the theft to the attendant at the central staion S, and informs him as to the electromagnetic code signal wave frequency that the receiver 6 on the automobile is set to receive. The attendant then actuates the station transmitter to generate and broadcast electromagnetic wave pulses at the specified frequency. If the stolen automobile A is within the preselected area 2 these wave pulses are picked up by the antenna 16 and transmitted to the receiver 6 of the receiver-transmitter mechanism 5. The receiver 6 upon the receipt of these code pulses effects through control mechanism 8, the energization of the associated transmitter 7 to generate and emit electromagnetic wave pulses, at a predetermined frequency, which are directly picked up by the pickup devices 80 at the radio direction finder stations 3 and 4. Upon the receipt of these pulses the pickup devices 80 effect the actuation of the pointers 54 and 55 to point in the same direction that the pulses are received at the radio beacon stations 3 and 4. The point of intersection P of the pointers 54 and 55 over the map 52 then indicates the position of the automobile A in the preselected area 2. If the automobile A is moving in the area 2 the pointers 54 and 55 will be correspondingly moved and their points of intersection P will trace upon the map 52 the path of movement of the automobile A in the preselected area 2. The police for that area or district can then be notified of the theft of the automobile A and told its exact location or path of movement in the area 2.

From the foregoing it will be apparent to those skilled in this art that I have provided a very simple and effective method and apparatus for accomplishing the objects of the invention.

It is to be understood that I am not limited to the specific construction disclosed herein as various modifications may be made therein within the spirit of the invention and the scope of the appended claims.

I claim:

1. An apparatus for locating and visually indicating the position of a vehicle in a pre-selected area comprising; a pair of radio direction finder stations disposed in the perimeter of said pre-selected area in spaced relation to each other, a mobile radio receiver and an associated mobile transmitter which are adapted to be mounted on said vehicle; and a radio transmitter and an indicating mechanism which are located at a central station; said mobile transmitter being normally de-energized and operative when energized to generate and emit electromagnetic wave pulses; said mobile receiver being adjusted to receive electromagnetic code pulses which are broadcast by said station transmitter at a predetermined frequency; interconnecting means between said mobile transmitter and said mobile receiver through which the energization of said mobile transmitter is effected by said mobile receiver upon the receipt of said electromagnetic code pulses by said mobile receiver; said indicating mechanism comprising a map of said pre-selected area, a pair of pivots located in the outline of said map in accordance with the location of said radio direction finder stations in the perimeter of said pre-selected area, a pair of pointers one of which is mounted on each of said pivots for arcuate movement over the face of said map, and a pair of electromagnetic actuators by which said pointers are actuated in accordance with current supplied to said actuators, one of which is connected to each of said pointers; pick-up means at each of said radio direction finder stations which are operative to directively receive the said electromagnetic wave pulses emitted by said mobile transmitter; a circuit which includes a current source, one of said actuators, and the pick-up means at one of said radio beacon stations; a second circuit which includes a current source, the other of said pair of actuators, and the pick-up means at the other of said radio direction finder stations; each of said pick-up means being operative to increase or decrease the flow of current to its associated actuator in accordance with the direction in which electromagnetic wave pulses are received by it from said mobile transmitter and thereby cause the pointer connected to said associated actuator to point in the same direction in which said wave pulses are received; and the intersection of said pointers over said map visually indicating the location of said vehicle in said pre-selected area.

2. A method of locating and visually indicating the position of a vehicle in a pre-selected area comprising; (1) mounting on said vehicle a normally de-energized radio transmitter, which is operative when energized to generate and emit electromagnetic wave pulses, a radio receiver which is adjusted to receive a predetermined electromagnetic code signal, and connecting means between said transmitter and said radio receiver through which said radio receiver is operative to effect the energization of said transmitter upon the receipt of said code signal; (2) locating at a central station an indicating mechanism which comprises a map of said pre-selected area, a pair of pointers which are rotatably mounted, for intersection over said map, upon spaced pivots disposed in the outline of said map, and electromagnetic actuating means by which said pointers are adapted to be rotated upon said pivots; (3) locating, in the periphery of said pre-selected area, a pair of spaced pick-up devices which are electrically connected to said actuating means and a current source, and are operative to directively receive electromagnetic wave pulses emitted by said radio transmitter and to effect the energization of said electromagnetic actuating means to position said pointers in intersecting relation in accordance with the direction in which said electromagnetic wave pulses are received by said pair of pick-up devices from said radio transmitter; (4) and broadcasting said electromagnetic code signal which when received by said radio receiver causes it to effect the energization of said radio transmitter to generate and emit electromagnetic wave pulses which are directively picked up by said pick-up devices and thereby effect the actuation of said pointers to intersect over said map in accordance with the location of said vehicle in said preselected area.

References Cited

UNITED STATES PATENTS 1,115,530  11/1914  Hammond _____ 343—112
2,821,704  1/1958  O'Day _____ 343—15

RODNEY D. BENNETT, *Primary Examiner.*

R. E. BERGER, *Assistant Examiner.*